US012623469B2

(12) United States Patent

Miyazawa et al.

(10) Patent No.: US 12,623,469 B2

(45) Date of Patent: May 12, 2026

(54) MEDIUM DISCHARGE DEVICE, POST PROCESS DEVICE, AND RECORDING SYSTEM

(71) Applicant: SEIKO EPSON CORPORATION, Tokyo (JP)

(72) Inventors: Masaki Miyazawa, Matsumoto (JP); Hiroyuki Kosuge, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 363 days.

(21) Appl. No.: 18/295,958

(22) Filed: Apr. 5, 2023

(65) Prior Publication Data

US 2023/0321999 A1 Oct. 12, 2023

(30) Foreign Application Priority Data

Apr. 8, 2022 (JP) ................................ 2022-064374

(51) Int. Cl.

*B65H 29/34* (2006.01)
*B41J 11/00* (2006.01)
*B41J 11/58* (2006.01)

(52) U.S. Cl.

CPC .............. *B41J 11/007* (2013.01); *B41J 11/58* (2013.01); *B65H 29/34* (2013.01); *B65H 2601/273* (2013.01)

(58) Field of Classification Search

CPC ......... B41J 11/007; B41J 11/58; B65H 29/34; B65H 2601/273; B65H 31/00; B65H 31/30; B65H 31/3009; B65H 31/3018

See application file for complete search history.

(56) References Cited

U.S. PATENT DOCUMENTS

| | | | | |
|---|---|---|---|---|
| 1,573,414 A * | 2/1926 | Mahoney | B65H 29/44 271/220 |
| 4,339,119 A * | 7/1982 | Sasaki | B65H 31/32 271/189 |
| 4,529,190 A * | 7/1985 | Goodwin | B65H 31/32 271/189 |
| 2015/0183606 A1* | 7/2015 | Nishi | B65H 31/02 271/234 |
| 2015/0309463 A1* | 10/2015 | Masunari | B65H 33/08 412/16 |
| 2016/0083215 A1* | 3/2016 | Furuta | B65H 29/14 271/208 |

(Continued)

FOREIGN PATENT DOCUMENTS

| | | |
|---|---|---|
| JP | H06312497 | 11/1994 |
| JP | H09240905 | 9/1997 |

(Continued)

*Primary Examiner* — Thomas A Morrison

(74) *Attorney, Agent, or Firm* — WORKMAN NYDEGGER

(57) ABSTRACT

The medium discharge device 40 includes a transport path TB for transporting the medium P recorded by the recording device 10, a discharge section 38 for discharging the medium P transported in the transport path TB, a pair of support sections 60 for supporting the medium P discharged by the discharge section 38 onto a support surface 60*a*, and a stacking section 33 provided below the pair of support sections 60 in a gravity direction and on which are stacked the medium P that dropped from the pair of support sections 60, and the pair of support sections 60 have conductive members.

11 Claims, 10 Drawing Sheets

(56) References Cited

U.S. PATENT DOCUMENTS

| | | | | |
|---|---|---|---|---|
| 2017/0152119 | A1* | 6/2017 | Kubota | B65H 31/34 |
| 2018/0237251 | A1* | 8/2018 | Taki | B65H 31/3018 |
| 2020/0307939 | A1* | 10/2020 | Taki | B65H 31/02 |
| 2021/0094329 | A1 | 4/2021 | Shimada et al. | |

FOREIGN PATENT DOCUMENTS

| | | | |
|---|---|---|---|
| JP | 2017-73205 | * | 4/2017 |
| JP | 2021-054595 | A | 4/2021 |

* cited by examiner

MEDIUM DISCHARGE DEVICE, POST PROCESS DEVICE, AND RECORDING SYSTEM

The present application is based on, and claims priority from JP Application Serial Number 2022-064374, filed Apr. 8, 2022, the disclosure of which is hereby incorporated by reference herein in its entirety.

BACKGROUND

1. Technical Field

The present disclosure relates to a medium discharge device, a post process device, and a recording system.

2. Related Art

In the related art, various medium discharge devices are used that include a discharge section that discharges a medium and a stacking section that stacks the medium discharged from the discharge section. Among them, there is a medium discharge device in which a medium discharged by the discharge section is supported by a pair of support sections, and the medium is dropped from the pair of support sections onto a stacking section to stack the medium on the stacking section. For example, JP-A-2021-54595 discloses a paper discharge device including a medium support section that supports a medium using a pair of support sections, and a stacking section on which is stacked the medium that dropped from the medium support section.

However, in related art medium discharge devices, in which a medium discharged by a discharge section is supported by a pair of support sections and in which the medium is dropped from the pair of support sections onto a stacking section to stack the medium on the stacking section, the pair of support sections may become charged with static electricity due to repeated contact between the medium and the pair of support sections. If the pair of support sections becomes charged with static electricity, then when a medium supported by the pair of support sections is dropped onto the stacking section, or after the medium is dropped onto the stacking section, sometimes the medium is attracted to the pair of support sections by the static electricity so that the alignment property on the stacking section degrades.

SUMMARY

In order to solve the above problem, a medium discharge device according to the present disclosure includes a transport path configured to transport a medium on which recording was performed by a recording device; a discharge section configured to discharge the medium that was transported through the transport path; a pair of support sections configured to support, on support surfaces, the medium discharged by the discharge section; and a stacking section that is provided below the pair of support sections in the gravity direction and on which is stacked the medium that dropped from the pair of support sections, wherein the pair of support sections includes a conductive member.

In order to solve the above problem, a post process device according to the present disclosure includes a transport path configured to transport a medium on which recording was performed by a recording device; a post process section configured to perform a post process on the medium on which recording was performed by the recording device; a discharge section configured to discharge the medium that was transported through the transport path; a pair of support sections configured to support, on support surfaces, the medium discharged by the discharge section; and a stacking section that is provided below the pair of support sections in the gravity direction and on which is stacked the medium that dropped from the pair of support sections, wherein the pair of support sections includes a conductive member.

In order to solve the above problem, a recording system according to the present disclosure includes a recording device and a post process device configured to perform a post process on a medium on which recording was performed by the recording device and to discharge the medium, wherein the post process device includes a transport path configured to transport the medium on which recording was performed by the recording device; a post process section configured to perform a post process on the medium on which recording was performed by the recording device; a discharge section configured to discharge the medium that was transported through the transport path; a pair of support sections configured to support, on support surfaces, the medium discharged by the discharge section; and a stacking section that is provided below the pair of support sections in the gravity direction and on which is stacked the medium that dropped from the pair of support sections, wherein the pair of support sections includes a conductive member.

DESCRIPTION OF EMBODIMENTS

Figure 1:
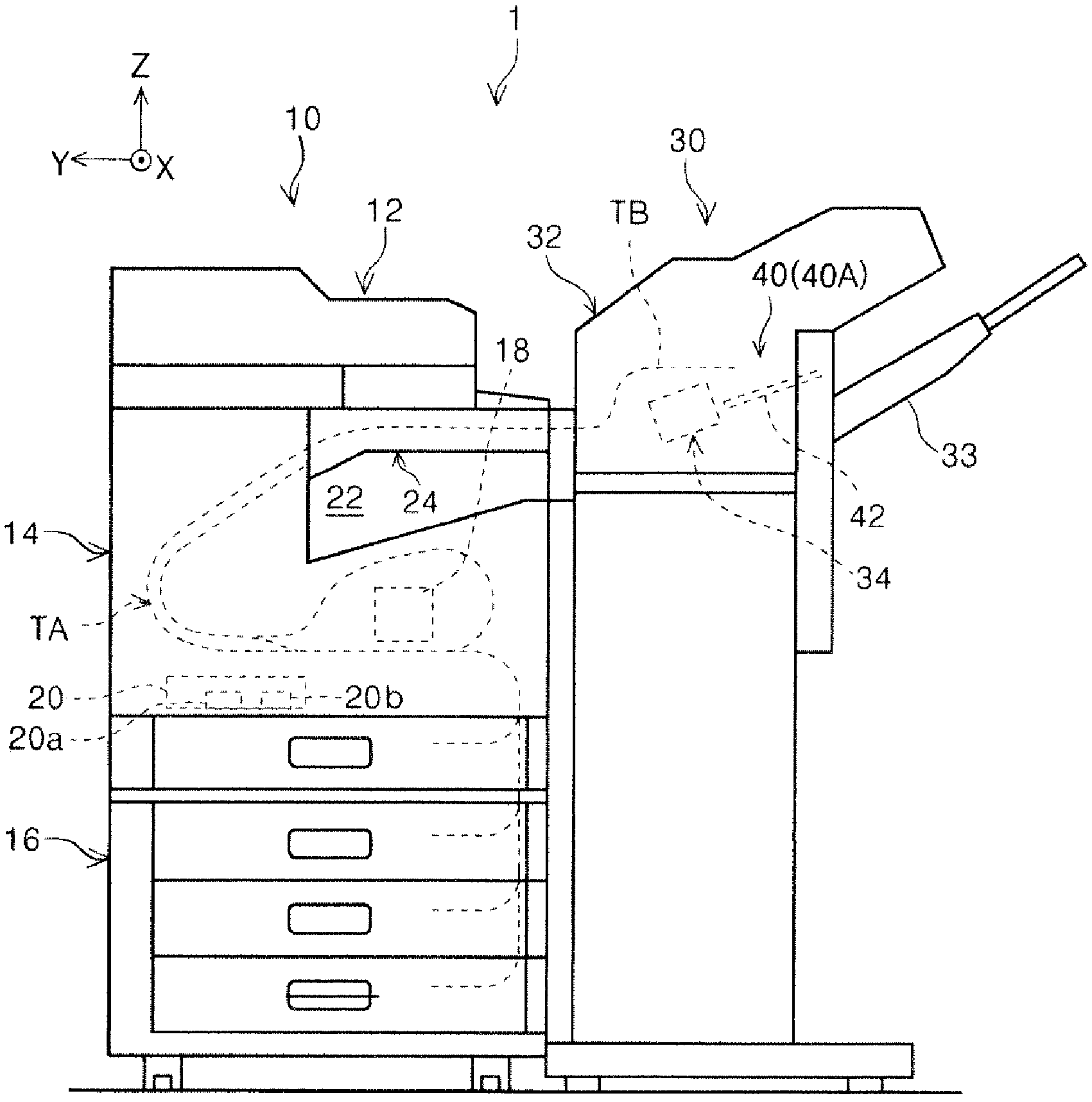
FIG. 1 is a front view of a recording system according to a first embodiment of the present disclosure.

The present disclosure will be described in general terms.

A medium discharge device according to a first aspect of the present disclosure includes a transport path configured to transport a medium on which recording was performed by a recording device; a discharge section configured to discharge the medium that was transported through the transport path; a pair of support sections configured to support, on support surfaces, the medium discharged by the discharge section; and a stacking section that is provided below the pair of support sections in the gravity direction and on which is stacked the medium that dropped from the pair of support sections, wherein the pair of support sections includes a conductive member.

According to this aspect, the pair of support sections includes a conductive member. For this reason, it is possible to discharge, by using the conductive member, static electricity that accumulated on the pair of support sections to outside of the pair of support sections, and it is possible to suppress degradation in the alignment property of the medium that was dropped from the pair of support sections onto the stacking section.

A medium discharge device according to a second aspect of the present disclosure is an aspect of the medium discharge device according to the first aspect, wherein the pair of support sections are configured to open and close by moving in opposite directions from each other in a width direction, which intersects a discharge direction of the medium and the medium is dropped onto the stacking section by opening the pair of support sections.

According to this aspect, the pair of support sections can be opened and closed by moving in opposite directions from the other in the width direction, and the medium is dropped onto the stacking section by opening the pair of support sections. For this reason, for example, it is possible to form a medium bundle of a desired number of sheets using the pair of support sections and to stack the medium on the stacking section for each medium bundle.

A medium discharge device according to a third aspect of the present disclosure is an aspect of the medium discharge device according to the first or second aspect, wherein the pair of support sections includes the conductive member at least on the support surfaces.

According to this aspect, the conductive member is provided at least on the support surfaces. Since the support surfaces repeatedly come into contact with the medium, by providing the conductive member on the support surfaces, it is possible to effectively discharge the static electricity to outside of the pair of support sections, and it is possible to effectively suppress degradation in the alignment property of the medium that was dropped from the pair of support sections onto the stacking section.

A medium discharge device according to a fourth aspect of the present disclosure is an aspect of the medium discharge device according to the first or second aspect, wherein the pair of support sections includes facing surfaces facing the stacking section, and the conductive member is provided at least on the facing surfaces.

According to this aspect, the conductive member is provided at least on the facing surfaces. For this reason, it is possible to effectively suppress degradation in the alignment property of the medium on the stacking section caused by the medium that was dropped onto the stacking section being attracted to the facing surfaces by static electricity.

A medium discharge device according to a fifth aspect of the present disclosure is an aspect of the medium discharge device according to the first or second aspect, further including a static electricity discharge section formed of conductive material, wherein the conductive member is grounded to the static electricity discharge section.

According to this aspect, the conductive member is grounded to the static electricity discharge section. For this reason, it is possible to effectively discharge, via the static electricity discharge section, the static electricity that accumulated on the pair of support sections to outside of the pair of support sections, and it is possible to effectively suppress degradation in the alignment property on the stacking section of the medium that dropped from the pair of support sections.

A medium discharge device according to a sixth aspect of the present disclosure is an aspect of the medium discharge device according to the first or second aspect, wherein the conductive member includes a conductive resin.

According to this aspect, the conductive member includes a conductive resin. Therefore, for example, it is possible to easily form a pair of support sections that is lightweight, using a material including a conductive resin.

A medium discharge device according to a seventh aspect of the present disclosure is an aspect of the medium discharge device according to the first or second aspect, wherein the conductive member is a sheet member provided on at least a portion of surfaces of the pair of support sections.

According to this aspect, the conductive member is a sheet member provided on at least a portion of the surfaces of the pair of support sections. Therefore, the pair of support sections can be formed using various kinds of constituent materials without being limited to a conductive material.

A medium discharge device according to an eighth aspect of the present disclosure is an aspect of the medium discharge device according to the first or second aspect, wherein the conductive member is a coat member coated on at least a portion of surfaces of the pair of support sections.

According to this aspect, the conductive member is a coat member coated on at least a portion of the surfaces of the pair of support sections. Therefore, the pair of support sections can be formed using various kinds of constituent materials without being limited to a conductive material.

A medium discharge device according to a ninth aspect of the present disclosure is an aspect of the medium discharge device according to the first or second aspect, wherein the conductive member is provided at least on the support surfaces and is a low-friction member having a static friction coefficient, with respect to the medium, that is smaller than that of the support surfaces.

According to this aspect, the conductive member is provided at least on the support surfaces and is a low-friction member. For this reason, it is possible to suppress a situation in which the medium is supported on the support surfaces in a state in which the medium is not disposed at a desired position, and the medium falls onto the placement section in that state, so that the alignment property of the medium on the stacking section is degraded.

A medium discharge device according to a tenth aspect of the present disclosure is an aspect of the medium discharge device according to the first or second aspect, further including a charge removing section provided in the transport path and configured to remove charge from the medium transported in the transport path.

According to this aspect, the charge removing section is provided in the transport path. For this reason, even when the static removal effect of the pair of support sections including the conductive member degrades, the charge removing section can compensate for the reduction in the static elimination effect of the pair of support sections, and thus it is possible to effectively suppress degradation in the alignment property of the medium on the stacking section which dropped from the pair of support sections.

A post process device according to an eleventh aspect of the present disclosure, includes a transport path configured to transport a medium on which recording was performed by a recording device; a post process section configured to perform a post process on the medium on which recording was performed by the recording device; a discharge section configured to discharge the medium that was transported through the transport path; a pair of support sections configured to support, on support surfaces, the medium discharged by the discharge section; and a stacking section that is provided below the pair of support sections in the gravity direction and on which is stacked the medium that dropped from the pair of support sections, wherein the pair of support sections includes a conductive member.

According to this aspect, the pair of support sections includes a conductive member. For this reason, it is possible to discharge, by using the conductive member, static electricity that accumulated on the pair of support sections to outside of the pair of support sections, and it is possible to suppress degradation in the alignment property of the medium that was dropped from the pair of support sections onto the stacking section.

A recording system according to a twelfth aspect of the present disclosure includes a recording device and a post process device configured to perform a post process on a medium on which recording was performed by the recording device and to discharge the medium, wherein the post process devices includes a transport path configured to transport the medium on which recording was performed by the recording device; a post process section configured to perform a post process on the medium on which recording was performed by the recording device; a discharge section configured to discharge the medium that was transported through the transport path; a pair of support sections configured to support, on support surfaces, the medium discharged by the discharge section; and a stacking section that is provided below the pair of support sections in the gravity direction and on which is stacked the medium that dropped from the pair of support sections, wherein the pair of support sections includes a conductive member.

According to this aspect, the pair of support sections includes a conductive member. For this reason, it is possible to discharge, by using the conductive member, static electricity that accumulated on the pair of support sections to outside of the pair of support sections, and it is possible to suppress degradation in the alignment property of the medium that was dropped from the pair of support sections onto the stacking section.

Hereinafter, the present disclosure will be specifically described. In each drawing, the X axis direction is the apparatus depth direction of the recording system 1. In the X axis direction, a +X direction, which is the direction in which the arrow faces, is a direction from the apparatus rear surface toward the apparatus front surface, and a −X direction is a direction from the apparatus front surface toward the apparatus rear surface. The X axis direction is an example of the width direction of the medium. The Y axis direction is the apparatus width direction of the recording system 1 and of the Y axis direction, the +Y direction, which is the direction in which the arrow faces, is the leftward direction as viewed from a user facing the front surface of the apparatus, and the −Y direction is the rightward direction. The Z axis direction is the apparatus height direction of the recording system 1, is a gravity direction, a +Z direction, which is the direction in which the arrow faces, is an upward in the gravity direction, and a −Z direction is downward in the gravity direction. In the following description, the +Z direction may be simply referred to as upward, and the −Z direction may be simply referred to as downward.

First Embodiment

First, an overview of a medium discharge device 40 (medium discharge device 40A), a post process device 30, and the recording system 1 according to first embodiment of the present disclosure will be described with reference to FIG. 1. As shown in FIG. 1, the recording system 1 includes a recording device 10 and the post process device 30. The recording device 10 according to the embodiment is an ink jet printer that performs recording by ejecting ink, which is an example of liquid, onto a medium, which is represented by recording paper, and includes a line head 18, which is an example of a recording section. The recording device 10 is a so-called multifunction peripheral including a scanner unit 12 at the upper section of the apparatus.

The recording device 10 includes a main body section 14, a medium accommodation section 16 that accommodates a medium, a medium transport section (not shown) that transports the medium, the line head 18 that performs recording on the medium, an in-body discharging section 22 to which the medium is discharged, a relay unit 24 that transports the medium to the post process device 30, and a control section 20 that performs control of the recording device 10, the post process device 30, and the medium discharge device 40. A transport path TA through which the medium is transported is provided inside the main body section 14. In the present embodiment, the control section 20 is provided in the recording device 10, but may be provided in the post process device 30 or in the medium discharge device 40 (to be described later).

The line head 18 has a plurality of ink ejection nozzles (not shown) arranged corresponding to the entire area of the medium in the X axis direction. The line head 18 performs recording on the medium by ejecting ink supplied from an ink tank (not shown) from the ink ejection nozzles toward the medium. The control section 20 includes a CPU 20*b* and a storage section 20*a*. The storage section 20*a* is configured by a storage medium such as a nonvolatile memory. Various programs, parameters, and the like for controlling the recording device 10, the medium discharge device 40, the post process device 30, and the like, which will be described later, are stored in the storage section 20*a*. The programs also include a program for controlling an opening and closing operation of the lower support tray 60 and a displacement operation of the main tray 33, which will be described later.

The medium on which recording was performed by the recording device 10 is sent to the post process device 30 via the relay unit 24. The post process device 30 includes a device main body 32, a process tray 42 provided inside the device main body 32, a stapler 34, which is an example of a post process section, a medium discharge device 40, shown FIG. 2, which discharges a medium on which the post process was performed to a lower support tray 60, which supports the medium from below, and a main tray 33 provided outside the device main body 32. In the post process device 30 of the present embodiment, it is also possible to form a medium bundle Pt on the lower support tray 60 without stapling using the stapler 34, and to place the unstapled medium bundle Pt on the main tray 33. The medium delivered from the relay unit 24 to the device main body 32 is transported along the transport path TB inside the device main body 32 and is sent to the process tray 42.

Hereinafter, the configuration of the post process device 30 will be further described with reference to FIG. 2 and FIGS. 3A to 3C. Hereinafter, the medium will be appended with the reference symbol P and referred to as medium P. A medium bundle including a plurality of sheets of the medium P is appended with reference symbol Pt and referred to as a medium bundle Pt. A direction along the support surface 42*a* of the process tray 42 is defined as an A axis direction, and a +A direction of the A axis direction is a discharge direction in which the medium bundle Pt is discharged from the process tray 42. In addition, a −A direction is a direction in which the medium P on the process tray 42 is pulled back toward a rear end alignment section 39. The A axis direction in the present embodiment is a direction including a +Z direction component and a −Y direction component. A direction orthogonal to the A axis direction as viewed from the X axis direction is referred to as a B axis direction.

A guide member 35 constitutes a portion of the transport path TB and extends toward the process tray 42. The medium P that is transported in the −Y direction along the guide member 35 is fed toward the process tray 42 by a transport roller 46 driven by a motor (not shown). The medium P sent to the process tray 42 is pulled back in the −A direction toward the rear end alignment section 39 by the pullback section 44. The pullback section 44 includes a first paddle 48 and a second paddle 54.

The first paddle 48 is made of an elastic material such as a rubber material and is provided so as to be rotatable about a rotation shaft 49, which extends in the X axis direction. The first paddle 48 is driven in the clockwise direction of FIG. 2 by a motor (not shown), thereby applying a feeding force in the −A direction to the medium P that was fed to the process tray 42. Similarly to the first paddle 48, the second paddle 54 is also made of an elastic material such as a rubber material and is provided so as to be rotatable about a rotation shaft 55, which extends in the X axis direction. The second paddle 54 is driven in the clockwise direction of FIG. 2 by a motor (not shown), thereby applying a −A direction feeding force to the medium P that was fed to the process tray 42.

The rear end alignment section 39 is provided in the −A direction with respect to the process tray 42. The rear end alignment section 39 has an alignment surface 39*a* parallel to the B axis direction, and the rear end Pe of the medium bundle Pt on the process tray 42 abuts against the alignment surface 39*a*, thereby the rear end Pe of the medium bundle Pt is aligned.

Side cursors 58 are provided so as to be movable in the X axis direction by a drive source (not shown), and align the X axis direction edges of the medium bundle Pt supported by the process tray 42 by coming into contact with edges. Note that the side cursors 58 are arranged with an interval therebetween in the X axis direction, and the two side cursors 58 are provided so as to approach each other or separate from each other. Of the two side cursors 58, the side cursor 58 provided in the −X direction is shown in FIG. 2.

A flap 37 is disposed side by side along the X axis direction with the rear end alignment section 39, and is provided so as to be swingable about a shaft section 37*a*, which extends in the X axis direction. The flap 37 presses downward on the medium bundle Pt on the process tray 42 in the vicinity of the rear end alignment section 39. A pressing member 36 is provided so as to be swingable about a shaft section 36*a*, which extends in the X axis direction. The pressing member 36 is provided to be rotatable by a motor (not shown), and by rotating, taps the medium P that was sent toward the process tray 42 by the transport roller 46 down toward the process tray 42. By this, the −A direction end section of the medium P fed toward the process tray 42 is appropriately guided to the rear end alignment section 39.

A discharge roller 38 is provided in the +A direction with respect to the process tray 42. The discharge roller 38 is an example of a discharge section that discharges, in the +A direction, the medium bundle Pt supported by the process tray 42. The discharge roller 38 is driven by a discharge roller drive motor (not shown). A discharge driven roller 41 is provided above the discharge roller 38 so as to be able to advance and retreat with respect to the discharge roller 38. The discharge driven roller 41 is separated from the discharge roller 38 except when the medium bundle Pt is to be discharged from the process tray 42, and when the medium bundle Pt is to be discharged from the process tray 42, the discharge driven roller 41 advances toward the discharge roller 38 by a power source (not shown) and nips the medium bundle Pt between itself and the discharge roller 38.

Figure 2:
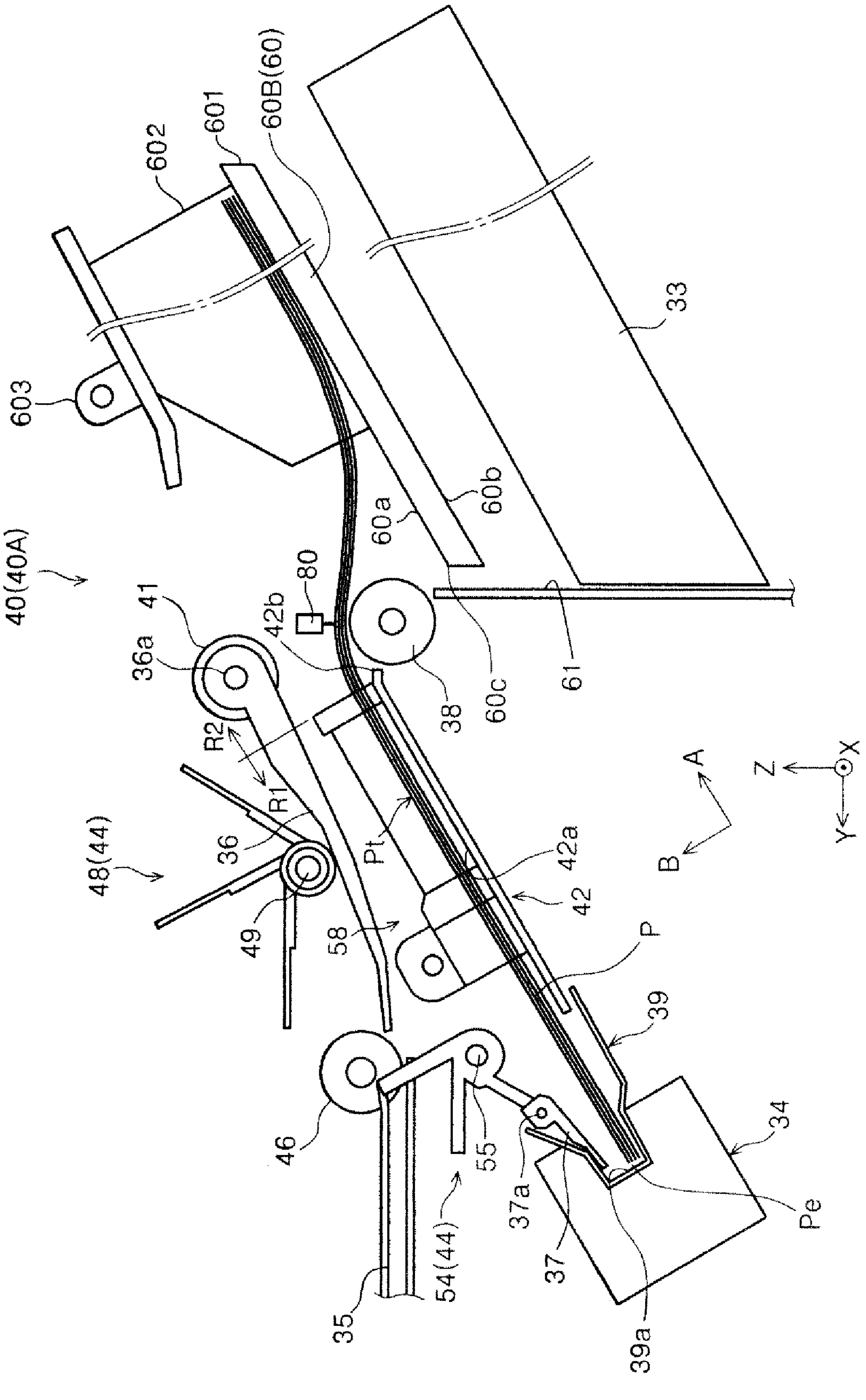
FIG. 2 is a front view showing internal configuration of a medium discharge device of the recording system of FIG. 1.

In FIG. 2, the discharge roller 38 discharges the medium bundle Pt, which is supported by the process tray 42 and which was bound by the stapler 34, toward the lower support tray 60. In the present embodiment, the post process is a binding process by the stapler 34, but the post process is not limited thereto, and may be a punching process of punching holes in the medium bundle Pt, a saddle stitching process of saddle stitching the medium bundle Pt, a shift discharge process of discharging the medium bundle Pt by alternately shifting the discharge position of the medium bundle Pt in the medium width direction (X axis direction), or the like. In addition, the medium bundle Pt may be discharged without being subjected to the post process, and the medium bundle Pt may be stacked on the main tray 33 in a so-called sheet stacking manner.

Figure 3A:
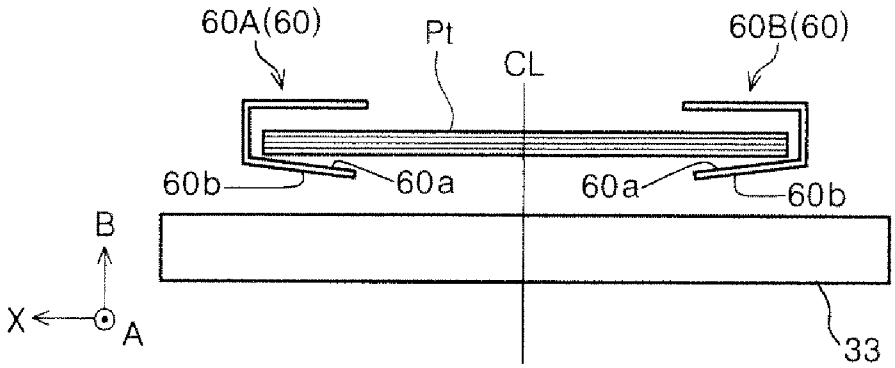
FIGS. 3A to 3C are side views of the medium discharge device of FIG. 2, as viewed from a discharge direction.
Figure 3B:
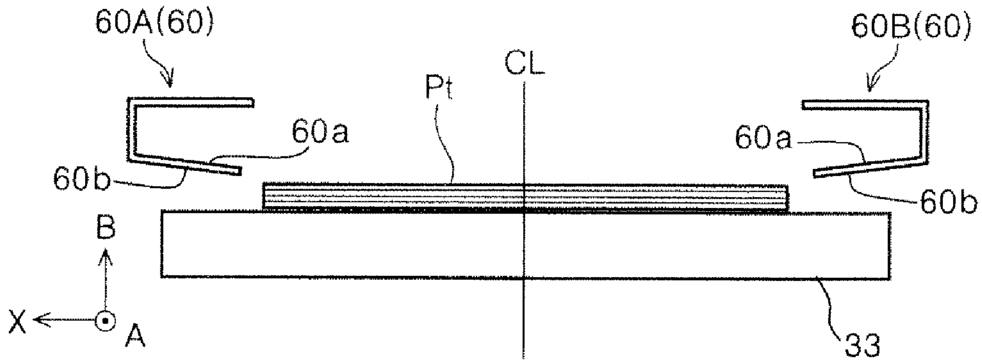
Figure 3C:
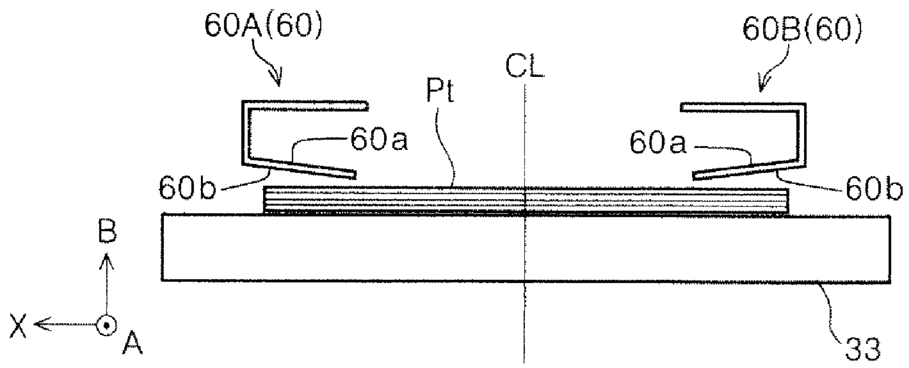

As shown in FIGS. 3A to 3C, the lower support tray 60 includes a first moving tray 60A and a second moving tray 60B that are spaced apart from each other in the X axis direction, that is, in the medium width direction. The lower support tray 60, that is, the first moving tray 60A and the second moving tray 60B, is an example of a pair of support sections. The first moving tray 60A is positioned in the +X direction with respect to the medium bundle Pt, and the second moving tray 60B is positioned in the −X direction with respect to the medium bundle Pt. Each of the first moving tray 60A and the second moving tray 60B is shaped to sandwich an X axis direction edge of the medium bundle Pt.

The first moving tray 60A and the second moving tray 60B are driven in the X axis direction by a lower support tray driving motor (not shown). In FIGS. 3A to 3C, the lower support tray 60 opens and closes by the first moving tray 60A and the second moving tray 60B moving in opposite directions from each other. To be specific, the lower support tray 60 opens up when the first moving tray 60A and the second moving tray 60B separate from each other, and closes when the first moving tray 60A and the second moving tray 60B approach each other. In FIGS. 3A to 3C, the straight line CL is a straight line parallel to the B axis direction and passes through the width direction center position of the medium P. The distance in the X axis direction between the first moving tray 60A and the straight line CL and the distance in the X axis direction between the second moving tray 60B and the straight line CL are always the same.

Closing the lower support tray 60 means that the interval in the X axis direction between the first moving tray 60A and the second moving tray 60B becomes, as shown in FIG. 3A, an interval at which the medium bundle Pt can be supported by support surfaces 60*a*. Opening the lower support tray 60 means that, as shown in FIG. 3B, the interval between the first moving tray 60A and the second moving tray 60B in the X axis direction becomes an interval at which the medium bundle Pt is not supported and drops onto the main tray 33.

The medium bundle Pt discharged by the discharge roller 38 is temporarily supported by the lower support tray 60 in its closed state, as shown in FIG. 3A. When the lower support tray 60 opens up as shown in FIG. 3B, the medium bundle Pt supported by the lower support tray 60 drops onto the main tray 33. Once the medium bundle Pt drops onto the main tray 33, then the lower support tray 60 closes as shown in FIG. 3C. When the lower support tray 60 closes, the main tray 33 moves downward to support the next medium bundle Pt. By providing such a lower support tray 60, it is possible to improve the stacking state of the medium bundle Pt on the main tray 33. The main tray 33 is an example of a stacking tray on which is stacked the medium bundle Pt that falls when the lower support tray 60 opens. The main tray 33 is driven in the stacking direction, that is, the Z axis direction, by a main tray driving motor (not shown).

As described above, the medium discharge device 40A of the embodiment includes the transport path TB for transporting the medium P on which recording was performed by the recording device 10, the discharge roller 38 as a discharge section for discharging the medium P transported through the transport path TB, the lower support tray 60 as a pair of support sections including the first moving tray 60A and the second moving tray 60B for supporting, on support surfaces 60*a*, the medium P that was discharged by the discharge roller 38, and the main tray 33 as a stacking section on which the medium P that dropped from the support tray 60 is stacked. In addition, the post process device 30 according to the embodiment includes, together with the medium discharge device 40A, the stapler 34 as a post process section that performs a post process on the medium P on which recording is performed by the recording device 10. In addition, the recording system 1 of the embodiment includes the recording device 10 together with the medium discharge device 40A and the post process device 30.

Figure 4A:
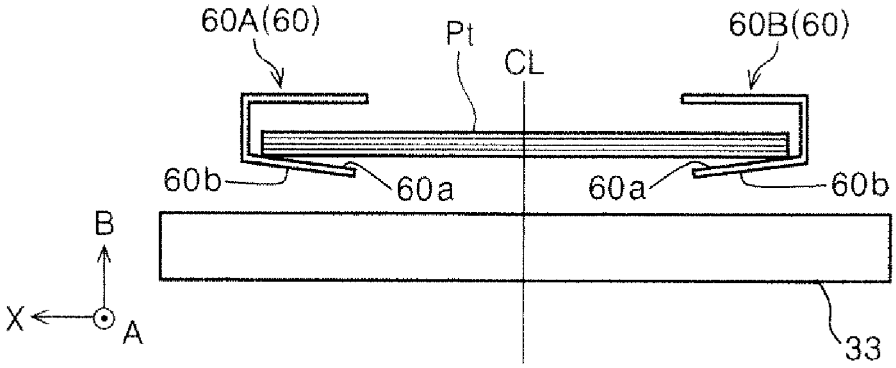
FIG. 4A to 4C are side views of the medium discharge device of FIG. 2, as viewed from the discharge direction, and is a view for explaining a problem when closing the lower support tray.
Figure 4B:
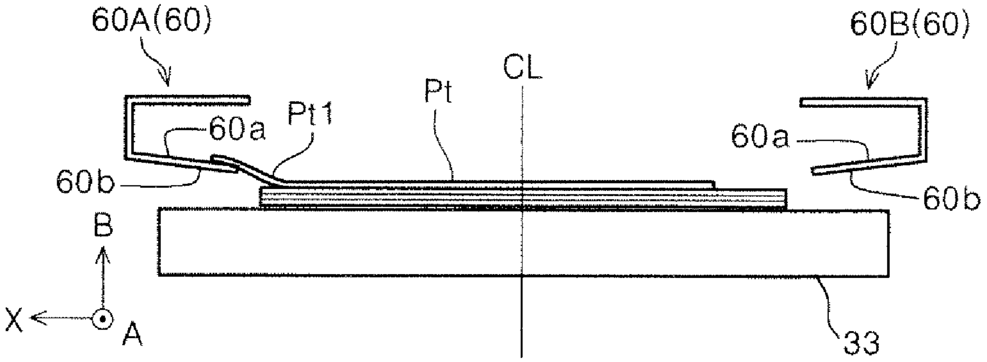
Figure 4C:
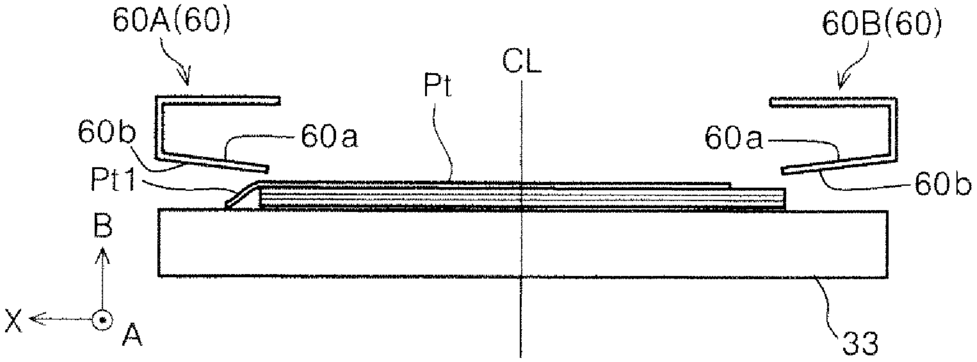

Next, a problem when the lower support tray 60 is closed will be described with reference to FIGS. 4A to 4C and the like. The problem described below is particularly likely to occur when a desired number of sheets of the medium P are fed one sheet at a time to the lower support tray 60 without stapling by the stapler 34, to form a medium bundle Pt on the lower support tray 60, and the medium bundle Pt is placed on the main tray 33. First, as shown in FIG. 2, the −A direction end 60*c* of the lower support tray 60 is positioned lower than the +A direction end 42*b* of the process tray 42. That is, a step is provided between the process tray 42 and the lower support tray 60. This makes it possible to suppress the occurrence of a problem in which the rear end Pe of the medium P or the medium bundle Pt remains on the discharge roller 38 without falling, when the medium P or the medium bundle Pt is discharged from the process tray 42 to the lower support tray 60.

Here, when the medium bundle Pt is discharged from the process tray 42 to the lower support tray 60, static electricity accumulates on the lower support tray 60 because the medium P and the medium bundle Pt move while in contact with the lower support tray 60. FIG. 4A shows a state in which an unstapled medium bundle Pt formed by feeding the medium P one sheet at a time is supported on the lower support tray 60, and the lower support tray 60 is charged with static electricity. When the lower support tray 60 opens up from this state, the medium bundle Pt drops onto the main tray 33. However, as described above, since the lower support tray 60 is electrostatically charged, for example the uppermost medium Pt1 of the medium bundle Pt may cling to the lower support tray 60 as shown in FIG. 4B. However, when the lower support tray 60 is closed in this state, then as shown in FIG. 4C, the uppermost medium Pt1 is placed on the main tray 33 at a position shifted with respect to the remaining medium bundle Pt. Although FIG. 4B shows a state in which the medium Pt1 clings to a support surface 60*a*, the medium Pt1 may cling to facing surfaces 60*b*, which are the opposite side from the support surfaces 60*a* and which face the main tray 33. In this case, even if the medium P and the medium bundle Pt are in an aligned state when they drop, when the lower support tray 60 closes, the uppermost medium Pt1 forming the medium bundle Pt clings to the lower support tray 60, and the uppermost medium Pt1 is placed on the main tray 33 at a position shifted with respect to the rest of medium bundle Pt. FIG. 4B shows a state in which only the uppermost medium Pt1 of the medium bundle Pt is shifted with respect to the remaining medium bundles Pt, but a plurality of sheets of the medium P of the medium bundle Pt may be shifted with respect to the rest of the medium bundle Pt.

For example, in order to avoid influence of static electricity accumulated on the lower support tray 60, such as some sheets of the medium P of the unstapled medium bundle Pt clinging to the facing surfaces 60*b*, it is desirable that the main tray 33 be disposed as low as possible with respect to the lower support tray 60. However, in such a configuration, the stacked state is easily disturbed when the medium bundle Pt drops from the lower support tray 60 to the main tray 33.

Figure 5:
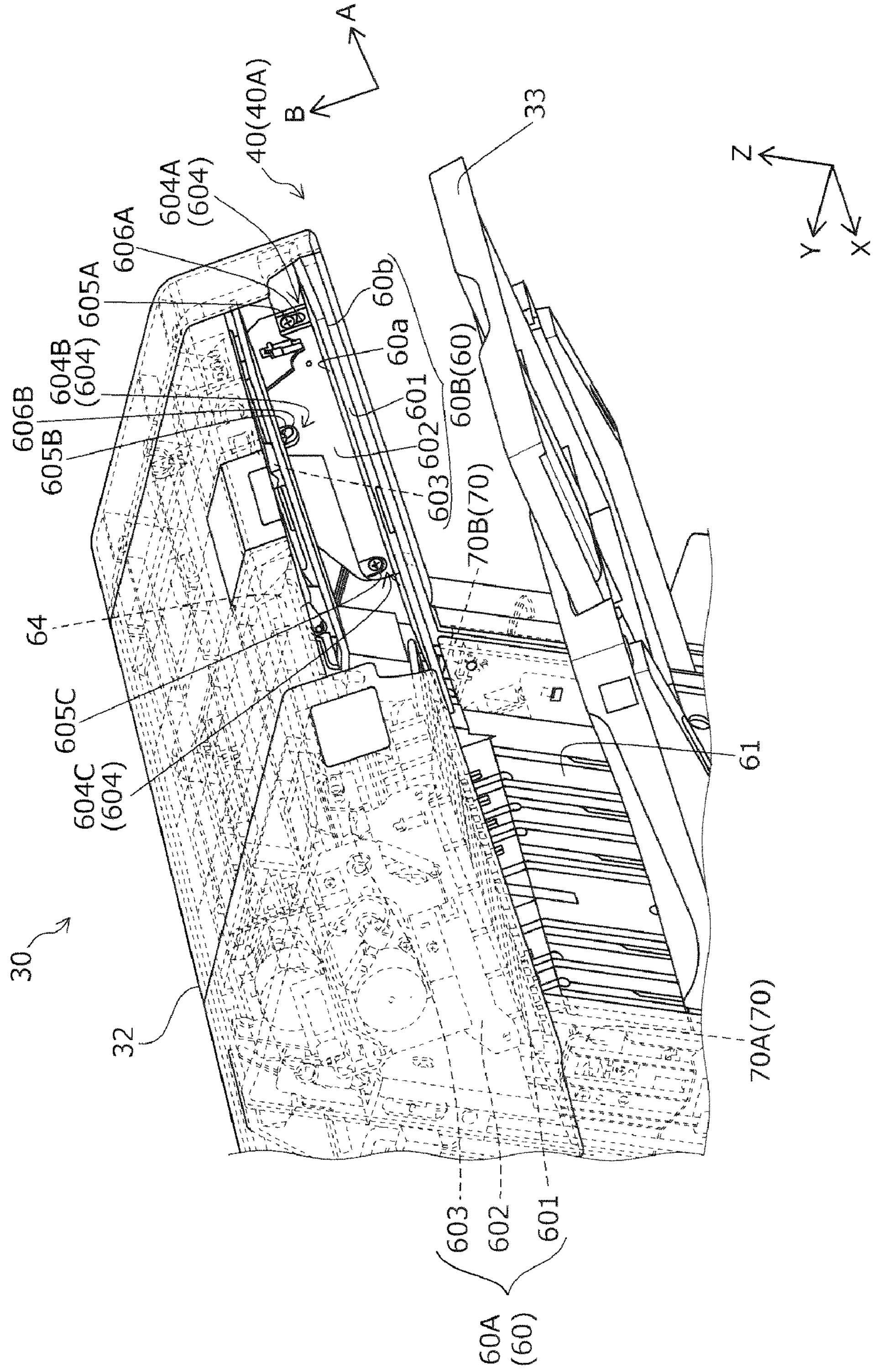
FIG. 5 is a perspective view showing partial configuration of the medium discharge device of FIG. 2.
Figure 6:
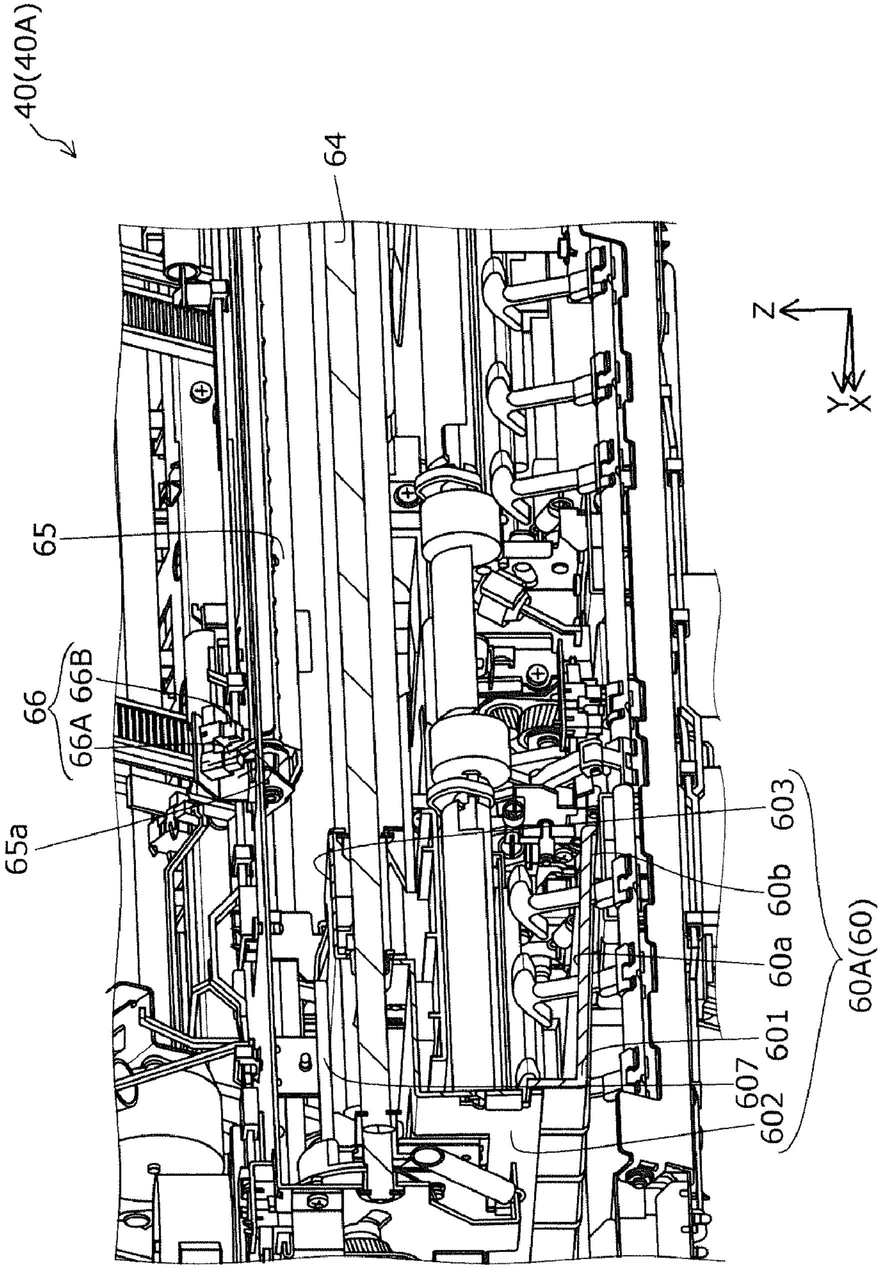
FIG. 6 is a perspective view showing internal configuration of the medium discharge device of FIG. 2.
Figure 7:
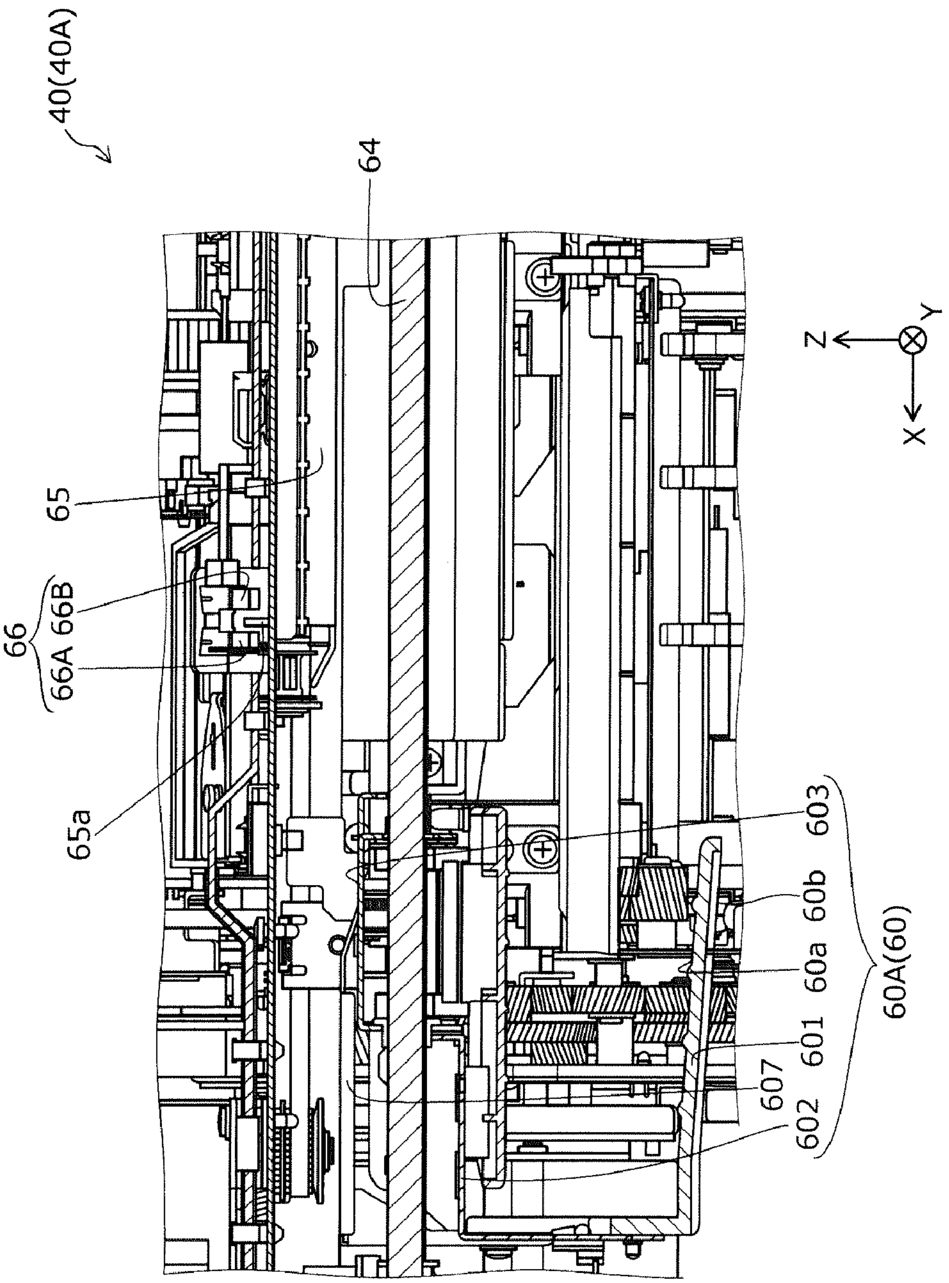
FIG. 7 is a side view showing internal configuration of the medium discharge device of FIG. 2.

Here, a specific configuration of the lower support tray 60 will be described with reference to FIGS. 5 to 8 in addition to FIGS. 3A to 3C and FIGS. 4A to 4C. In the lower support tray 60 of the present embodiment, the first moving tray 60A and the second moving tray 60B are substantially symmetrical as viewed from the A axis direction, and have substantially the same configuration. As shown in FIGS. 5 to 7, the lower support tray 60 of the present embodiment includes the first moving tray 60A and the second moving tray 60B, a support member 601, which has the support surfaces 60*a* and the facing surfaces 60*b*, a sheet metal member 602, which is made of metal and is connected to the support member 601 by an attachment section 604, and a bearing section 603, which is made of metal, is connected to the sheet metal member 602, and is supported movable along the X axis direction with respect to a guide shaft 64, which extends in the X axis direction.

Here, the support member 601 according to the present embodiment is made of a conductive resin. In this way, it is desirable that the lower support tray 60 has a conductive member. By providing the lower support tray 60 with a conductive member, static electricity accumulated on the lower support tray 60 can be discharged to outside the lower support tray 60 by the conductive member, and it is possible to suppress degradation in the alignment property of the medium bundle Pt dropped from the lower support tray 60 on the main tray 33. With such a configuration, it is possible to suppress a degradation in alignment of the medium bundle Pt, such as shown in FIGS. 4A to 4C, associated with dropping the medium bundle Pt from the lower support tray 60 to the main tray 33, that is, it is possible to stack the medium bundle Pt on the main tray 33 as shown in FIGS. 3A to 3C without degradation of the alignment property of the medium bundle Pt. Although the support member 601 according to the present embodiment is made of a conductive resin, the support member 601 may be made of a conductive metal. However, when the support member 601 is formed of a conductive metal, the lower support tray 60 becomes heavy. Therefore, it is particularly desirable that the support member 601 be configured from a conductive resin.

As shown in FIGS. 3A to 3C, the lower support tray 60 according to the present embodiment can open and close by the first moving tray 60A and the second moving tray 60B moving in opposite directions from each other in the width direction, which corresponds to the X axis direction, which is a direction that intersects the +A direction, which corresponds to the discharge direction of the medium P, and the medium P is dropped onto the main tray 33 by the lower support tray 60 opening. For this reason, in the medium discharge device 40A of the embodiment, for example, even in a case where stapling is not performed by the stapler 34, it is possible to form a medium bundle Pt on the lower support tray 60 in a desired number of sheets and to stack the medium P for each medium bundle Pt on the main tray 33. In addition, by providing the lower support tray 60 having such a configuration, even with a configuration including a post process section other than the stapler 34, it is possible to easily form medium bundles Pt with the desired number of sheets using the lower support tray 60.

As described above, in the lower support tray 60 according to the present embodiment, the support member 601 is made of conductive resin. That is, it can be said that the lower support tray 60 of the present embodiment has a conductive member at least on the support surfaces 60*a*. Since the support surfaces 60*a* repeatedly come into contact with the medium P, by providing the conductive member on the support surfaces 60*a* as in the lower support tray 60 of the present embodiment, it is possible to effectively discharge static electricity to outside the lower support tray 60, and it is possible to effectively suppress degradation in the alignment property of the medium P that dropped from the lower support tray 60 on the main tray 33.

On the other hand, it can also be said that the lower support tray 60 of the present embodiment has the facing surfaces 60*b* that face the main tray 33, and has a conductive member at least on the facing surfaces 60*b*. By providing the conductive member at least on the facing surfaces 60*b* in this manner, it is possible to effectively suppress degradation in the alignment property of the medium P on the main tray 33, caused by the medium P that dropped onto the main tray 33 being attracted to the facing surfaces 60*b* by static electricity.

Here, the support member 601 forming the lower support tray 60 is made of a conductive resin, and similarly, the sheet metal member 602 and the bearing section 603 forming the lower support tray 60 are made of metal and have conductivity. The bearing section 603 is in contact with the metal guide shaft 64, the guide shaft 64 is attached to a metal frame (not shown), and the frame is grounded via casters or the like. That is, the medium discharge device 40A according to the present embodiment includes the guide shaft 64 or the like as a static electricity discharge section formed of a conductive material, and the conductive member of the lower support tray 60 is grounded by the guide shaft 64 or the like as a static electricity discharge section. For this reason, in the medium discharge device 40A of the embodiment, it is possible to effectively discharge static electricity accumulated on the lower support tray 60 to outside the lower support tray 60 through the guide shaft 64 and the like, and it is possible to effectively suppress deterioration of the alignment property of the medium P that dropped from the lower support tray 60 onto the main tray 33.

As shown in FIG. 2, the medium discharge device 40A according to the present embodiment is provided with a charge removing brush 80 as a charge removing section at a position facing the discharge roller 38. In this way, it is desirable to provide a charge removing section in the transport path of the medium P such as the transport path TB, for removing charge from the medium P that is transported in the transport path. For example, even if the static elimination effect of the lower support tray 60, which includes a conductive member, degrades, the charge removing section can compensate for the degradation in the static elimination effect of the lower support tray 60, and thus it is possible to effectively suppress degradation in the alignment property of the medium that dropped from the lower support tray 60 onto the stacking section.

In addition, the charge removing section of the present embodiment is the charge removing brush 80 configured by a base section, which is made of metal and is provided to extend in the X axis direction, and a plurality of string-like members, which are made of metal and wherein the base ends are connected to the base section and the tip ends are in contact with the medium P, but is not limited to such a configuration. The charge removing brush 80 may have a configuration different from that of the present embodiment, or may have a charge removing section with a configuration different from that of the charge removing brush 80, such as an ionizer. In the present embodiment, the charge removing section is provided at a position facing the discharge roller 38, but may be provided at another position in the transport path of the medium P. For example, it may be provided in the relay unit 24 or the like, and in such a case, the relay unit 24 can also be regarded as the medium discharge device 40 or the post process device 30.

Figure 8:
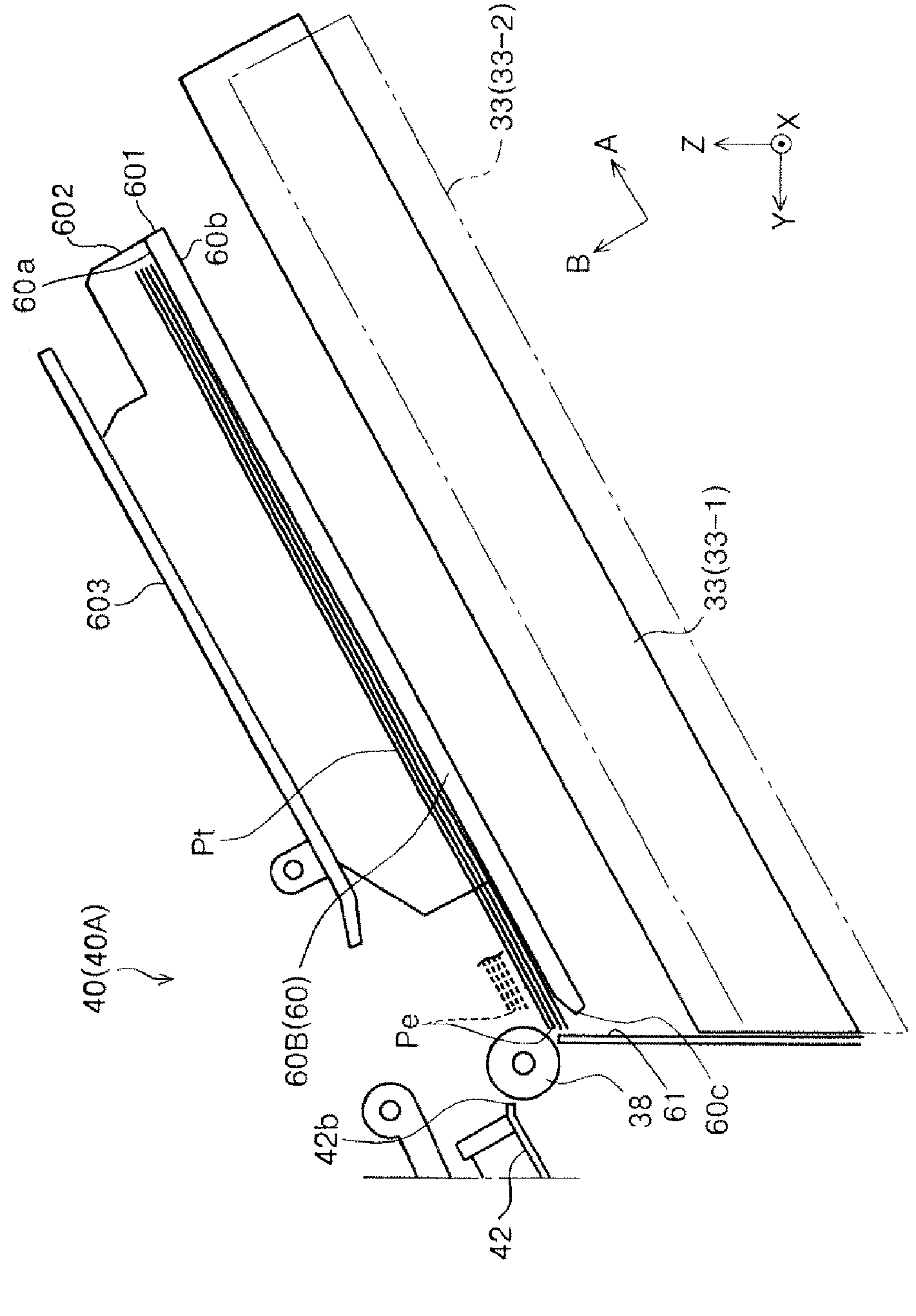
FIG. 8 is a front view showing internal configuration of the medium discharge device of FIG. 2.

Note that the main tray 33 according to the present embodiment is configured to be automatically displaceable in the Z axis direction under the control of the control section 20. Specifically, for example, when the medium bundle Pt is stacked by a predetermined thickness, then as shown in FIG. 8 the main tray 33 moves in the −Z direction from the initial position 33-1 to the lowered position 33-2. When the medium bundle Pt is further stacked by a predetermined thickness on the main tray 33 at the lowered position 33-2, the main tray 33 according to the present embodiment moves further from the lowered position 33-2 by a predetermined amount in the −Z direction.

Since the medium discharge device 40A of the embodiment has such a configuration, it is possible to displace the main tray 33 in the Z axis direction in accordance with the stacking thickness of the medium bundle Pt placed on the main tray 33, and to automatically adjust the falling distance of the medium bundle Pt from the lower support tray 60 to the placement position on the main tray 33 to a desired range. More specifically, how high the medium bundle Pt is stacked on the main tray 33 is detected at a position on the upstream side and at a position on the downstream side in the +A direction, which corresponds to the discharge direction of the medium P, from the viewpoint of whether or not a threshold has been reached, and when it is detected that the threshold was reached, the position of the main tray 33 is moved by a predetermined amount in the −Z direction. Hereinafter, a specific configuration thereof will be described.

As shown in FIG. 5, the medium discharge device 40A according to the embodiment includes a rear end side optical sensor 70 at a position on the −A direction side (the upstream side in the discharge direction of the medium P) in the stacking range of the medium P on the main tray 33. The rear end side optical sensor 70 emits light in the −X direction from a light emitting section 70A toward a light receiving section 70B, and detects whether or not the +A direction side end section of the medium bundle Pt has reached the irradiation path of light depending on whether or not light was received by the light receiving section 70B. When the medium bundle Pt is stacked on the main tray 33 to a predetermined height or more, the −A direction side end section of the medium bundle Pt reaches the irradiation path of the light and blocks the light, and thus the medium discharge device 40A of the present embodiment moves the position of the main tray 33 in the −Z direction by a predetermined amount under the control of the control section 20.

In addition, as shown in FIGS. 6 and 7, the medium discharge device 40A of the embodiment includes a tip end photosensor 66. The tip end photosensor 66 emits light in the −X direction from a light emitting section 66A toward a light receiving section 66B, and detects whether or not the light was received by the light receiving section 66B. As described above, the lower support tray 60 is movable in the X axis direction along the guide shaft 64. Here, FIGS. 6 and 7 show an open state in which the lower support tray 60 is in the position of FIG. 3B, which is the state when the medium bundle Pt is dropped onto the main tray 33. However, when the lower support tray 60 is in the closed state, which is the position shown in FIG. 3A and FIG. 3C, in which the lower support tray 60 can support the medium bundle Pt, the lower support tray 60 is disposed on the inner side in the X axis direction. When the lower support tray 60 is in the closed state, a flag push in section 607, which is a portion of the lower support tray 60, reaches a position opposed to a flag 65. The flag 65 is configured to be rotatable with respect to an X axis direction rotation axis, and is configured such that by being pressed upward and rotated from the position shown in FIGS. 6 and 7, a protrusion section 65*a* provided on the flag 65 is disposed between the light emitting section 66A and the light receiving section 66B.

Here, as shown in FIG. 5, the support member 601 of the lower support tray 60 is attached to the sheet metal member 602 at three attachment sections 604 of an attachment section 604A, an attachment section 604B, and an attachment section 604C. The attachment section 604A has an elongated hole 606A and a screw 605A fitted into the elongated hole 606A, the attachment section 604B has an elongated hole 606B and a screw 605B fitted into the elongated hole 606B, and the attachment section 604C has a screw 605C fitted into a screw hole. Here, the support member 601 is configured to be movable with respect to the sheet metal member 602 by an amount of play between the elongated hole 606A and the screw 605A and an amount of play between the elongated hole 606B and the screw 605B. That is, the support member 601 is rotatable with respect to the sheet metal member 602 with the attachment section 604C as a rotation axle extending in the X axis direction.

When the lower support tray 60 is in the closed state, if a medium bundle Pt is stacked on the main tray 33 to a predetermined height or more, then the uppermost medium P of the medium bundle Pt will contact the lower support tray 60, and the support member 601 of the lower support tray 60 will be pushed up from the lower side. Here, the flag push in section 607 is fixed to the support member 601, and is rotatable together with the support member 601 with respect to the sheet metal member 602. Therefore, when the support member 601 is pushed up from the lower side by the uppermost medium P, the flag push in section 607 also rotates together with the support member 601 with respect to the sheet metal member 602. Then, the flag push in section 607 pushes up the flag 65 from the lower side, and the protrusion section 65*a* provided on the flag 65 becomes disposed between the light emitting section 66A and the light receiving section 66B. That is, when the medium bundle Pt is stacked on the main tray 33 to a predetermined height or more, then the medium bundle Pt pushes up the flag 65 via the support member 601 and the flag push in section 607, and so that the tip end photosensor 66 enters a state of having detected the protrusion section 65*a*. In such a state, the medium discharge device 40A according to the embodiment moves the position of the main tray 33 in the −Z direction by a predetermined amount under the control of the control section 20.

As described above, the support member 601 of the medium discharge device 40A according to the present embodiment is configured from conductive resin. As described above, as a conductive member constituting at least a portion of the lower support tray 60, it is desirable that it contains a conductive resin. For example, a lightweight tray 60 can be easily formed using a material containing a conductive resin. However, the support member 601 may be formed of a resin that is not a conductive resin, and a conductive member may be separately provided on the support member 601.

Second Embodiment

Hereinafter, the medium discharge device 40 (a medium discharge device 40B) of a recording system according to a second embodiment will be described with reference to FIG. 9. The recording system of the present embodiment is similar to the recording system 1 of the first embodiment except for the configuration described below. Specifically, the only difference is that a sheet member 62, which is conductive and has a low friction property with respect to the medium P, is adhered to the support member 601 of the lower support tray 60 of the medium discharge device 40A of the recording system 1 of the first embodiment. Therefore, the medium discharge device 40B of the recording system according to the present embodiment has the same features as those of the recording system 1, the post process device 30, and the medium discharge device 40 according to the first embodiment, except for the points described below. Therefore, in FIG. 9, components common to those in the first embodiment are denoted by the same reference numerals, and detailed description thereof is omitted.

Figure 9:
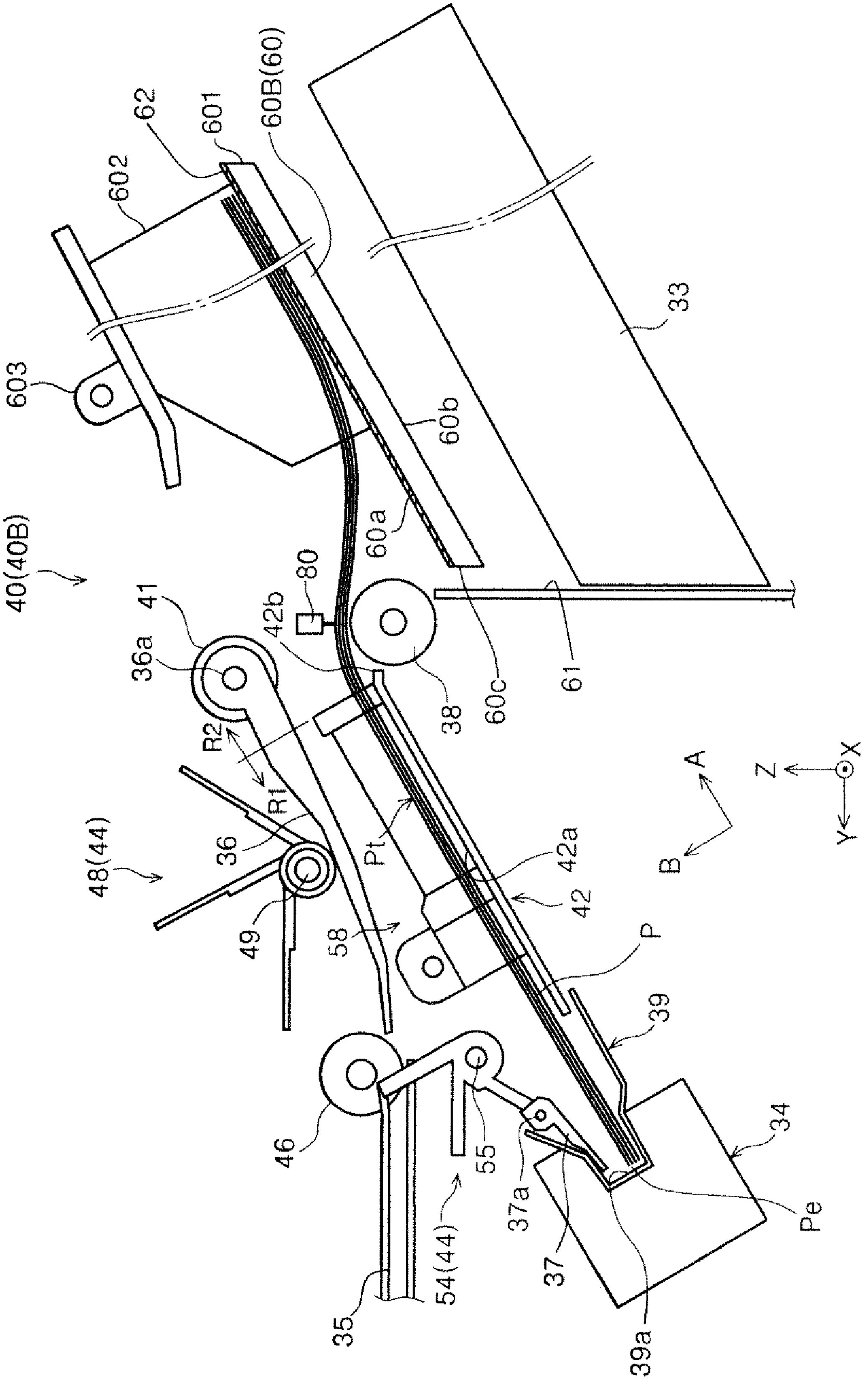
FIG. 9 is a front view showing internal configuration of a medium discharge device of a recording system according to a second embodiment of the present disclosure.

As shown in FIG. 9, in the medium discharge device 40B according to the present embodiment, the sheet member 62, which has higher conductivity than the support member 601, is attached to the support surfaces 60*a* of the support member 601 of the lower support tray 60. In this way, the sheet member 62 provided on at least a portion of the surface of the lower support tray 60 can be used as a conductive member included in the lower support tray 60. Note that the support member 601 of the present embodiment is formed of a conductive resin similar to the support member 601 of the first embodiment, but is not limited to such a configuration, and by using the conductive sheet member 62 as a conductive member, the support member 601 and the like of the lower support tray 60 can be formed using various types of constituent materials without being limited to a conductive material.

In addition, the sheet member 62 according to the present embodiment is a sheet member having a low friction property with respect to the medium P. Therefore, the medium discharge device 40B according to the embodiment can be said to be provided at least on the support surfaces 60*a* as the conductive member included in the lower support tray 60 and to be a low friction member with a smaller static friction coefficient with respect to the medium P than the support surfaces 60*a*. With such a configuration, it is possible to suppress a situation in which the medium P is supported on the support surfaces 60*a* in a state in which the medium P is not disposed at a desired position, the medium P falls onto the main tray 33 in this state, and the alignment property of the medium P on the main tray 33 is degraded.

For example, in the medium discharge device 40A according to the first embodiment, before the medium P is dropped from the lower support tray 60 to the main tray 33, not only a case as indicated by a solid line in FIG. 8, where the rear end Pe of the medium bundle Pt reaches the rear end wall 61, but also a case may occur as indicated by a broken line in FIG. 8, where the rear end Pe of the medium bundle Pt does not reach the rear end wall 61. This is because the frictional force between the medium bundle Pt and the support surfaces 60*a* is too strong. In FIG. 8, the height in the Z axis direction of the medium bundle Pt represented by broken line in FIG. 8 is depicted as being further to the +Z direction side than is the height in the Z axis direction of the medium bundle Pt represented by solid line in FIG. 8. However, the actual height in the Z axis direction of the medium bundle Pt represented by broken line in FIG. 8 is the same as the height in the Z axis direction of the medium bundle Pt represented by solid line in FIG. 8, and FIG. 8 only shows that the position of the rear end Pe of the medium bundle Pt represented by broken line in FIG. 8 is shifted to the +A direction side with respect to the rear end Pe of the medium bundle Pt represented by solid line in FIG. 8. When a case where the rear end Pe of the medium bundle Pt reaches the rear end wall 61 and a case where the rear end Pe of the medium bundle Pt does not reach the rear end wall 61 coexist, then the alignment property of the medium P on the main tray 33 in the A axis direction degrades.

On the other hand, in the medium discharge device 40B of the embodiment, by providing the sheet member 62, which is a low friction member, on the support surfaces 60*a*, it is possible to suppress occurrence of a case in which the rear end Pe of the medium bundle Pt does not reach the rear end wall 61 before the medium P is dropped from the lower support tray 60 to the main tray 33. Therefore, it is possible to suppress degradation in the alignment property of the medium P on the main tray 33 in the A axis direction.

Third Embodiment

Hereinafter, the medium discharge device 40 (a medium discharge device 40C) of a recording system according to the third embodiment will be described with reference to FIG. 10. The recording system of the present embodiment is similar to the recording system 1 of the first embodiment except for the configuration described below. Specifically, the only difference is that the support surfaces 60*a* of the support member 601 of the lower support tray 60 of the medium discharge device 20A of the recording system 1 of the first embodiment are coated with a coat member 63 having higher conductivity than the support member 601. Therefore, the medium discharge device 40C of the recording system according to the present embodiment has the same features as those of the recording system 1, the post process device 30, and the medium discharge device 40 according to the first embodiment, except for the following description. Therefore, in FIG. 10, components common to those in the first embodiment are denoted by the same reference numerals, and detailed description thereof is omitted.

Figure 10:
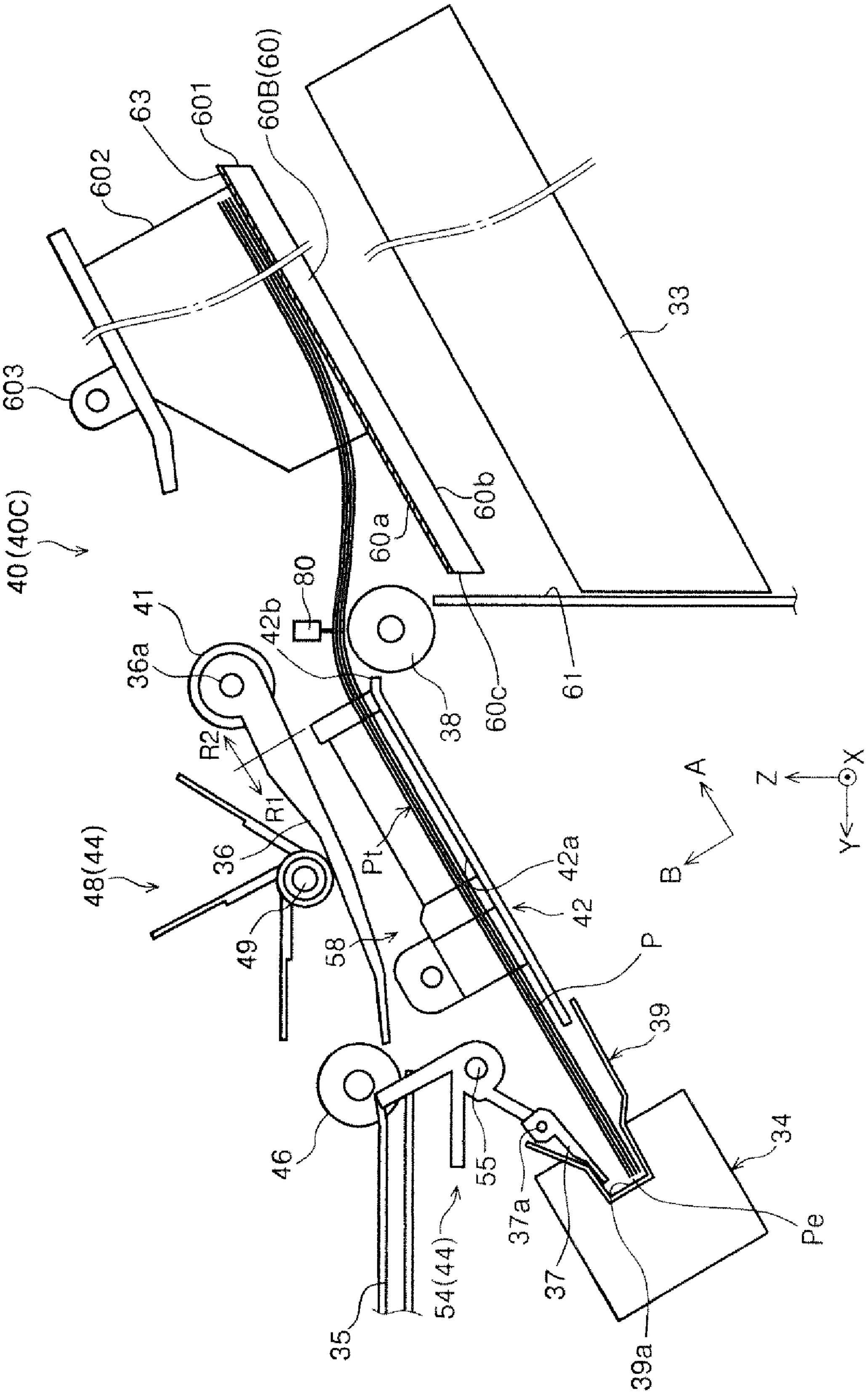
FIG. 10 is a front view showing internal configuration of a medium discharge device of a recording system according to a third embodiment of the present disclosure.

As shown in FIG. 10, in the medium discharge device 40C of this embodiment, the support surfaces 60*a* of the support member 601 of the lower support tray 60 are coated with a coat member 63 having higher conductivity than the support member 601. As described above, the coat member 63 coated on at least a portion of the surface of the lower support tray 60 can be used as the conductive member. The support member 601 according to the present embodiment is formed of a conductive resin similarly to the support member 601 according to the first embodiment, but is not limited to such a configuration. By using the coat member 63 as a conductive member, it is possible to form the support member 601 and the like of the lower support tray 60 using various types of constituent materials without being limited to a conductive material.

The present disclosure is not limited to the embodiments described above, and various modifications can be made within the scope of the disclosure described in the claims, and it is needless to say that these are also included in the scope of the present disclosure.

What is claimed is:

1. A medium discharge device comprising:
- a transport path configured to transport a medium on which recording was performed by a recording device;
- a discharge section configured to discharge the medium that was transported through the transport path in a discharge direction;
- a pair of support sections configured to support, on support surfaces, the medium discharged by the discharge section, said pair of support sections being movable in a direction transverse to the discharge direction towards one another to a position that supports opposite edges of the medium and away from one another to a position that drops the medium;
- a stacking section that is provided below the pair of support sections in the gravity direction and on which is stacked the medium that dropped from the pair of support sections; and
- a static electricity discharge section formed of conductive material, wherein the pair of support sections includes a conductive member, and
- the conductive member is grounded to the static electricity discharge section.

2. The medium discharge device according to claim 1, wherein the pair of support sections are configured to open and close by moving in opposite directions from each other in a width direction, which intersects the discharge direction of the medium and the medium is dropped onto the stacking section by opening the pair of support sections.

3. The medium discharge device according to claim 1, wherein
- the pair of support sections includes the conductive member at least on the support surfaces.

4. The medium discharge device according to claim 1, wherein
- the pair of support sections includes facing surfaces facing the stacking section, and the conductive member is provided at least on the facing surfaces.

5. The medium discharge device according to claim 1, wherein
- the conductive member includes a conductive resin.

6. The medium discharge device according to claim 1, wherein
- the conductive member is a sheet member provided on at least a portion of surfaces of the pair of support sections.

7. The medium discharge device according to claim 1, wherein the conductive member is a coat member coated on at least a portion of surfaces of the pair of support sections.

8. The medium discharge device according to claim 1, wherein the conductive member is provided at least on the support surfaces and is a low-friction member having a static friction coefficient, with respect to the medium, that is smaller than that of the support surfaces.

9. The medium discharge device according to claim 1, further comprising:

a charge removing section provided in the transport path and configured to remove charge from the medium transported in the transport path.

10. A post process device comprising:

a transport path configured to transport a medium on which recording was performed by a recording device;

a post process section configured to perform a post process on the medium on which recording was performed by the recording device;

a discharge section configured to discharge the medium that was transported through the transport path in a discharge direction;

a pair of support sections configured to support, on support surfaces, the medium discharged by the discharge section, said pair of support sections being movable in a direction transverse to the discharge direction towards one another to a position that supports opposite edges of the medium and away from one another to a position that drops the medium;

a stacking section that is provided below the pair of support sections in the gravity direction and on which is stacked the medium that dropped from the pair of support sections; and a static electricity discharge section formed of conductive material, wherein the pair of support sections includes a conductive member, and the conductive member is grounded to the static electricity discharge section.

11. A recording system comprising:

a recording device and a post process device configured to perform a post process on a medium on which recording was performed by the recording device and to discharge the medium, wherein the post process device includes a transport path configured to transport the medium on which recording was performed by the recording device;

a post process section configured to perform a post process on the medium on which recording was performed by the recording device;

a discharge section configured to discharge the medium that was transported through the transport path in a discharge direction;

a pair of support sections configured to support, on support surfaces, the medium discharged by the discharge section, said pair of support sections being movable in a direction transverse to the discharge direction towards one another to a position that supports opposite edges of the medium and away from one another to a position that drops the medium;

a stacking section that is provided below the pair of support sections in the gravity direction and on which is stacked the medium that dropped from the pair of support sections, wherein the pair of support sections includes a conductive member, the conductive member is provided at least on the support surfaces;

a static electricity discharge section formed of conductive material, and the conductive member is grounded to the static electricity discharge section.

* * * * *